Patented Jan. 4, 1944

2,338,177

UNITED STATES PATENT OFFICE 2,338,177

CONDENSATION PRODUCT AND PROCESS OF MAKING SAME

Charles Graenacher, Riehen, Richard Sallmann, Bottmingen, and Otto Albrecht, Basel, Switzerland, assignors to Society of Chemical Industry in Basle, Basel, Switzerland, a firm No Drawing. Application October 13, 1939, Serial No. 299,388. In Switzerland October 14, 1938

24 Claims. (Cl. 260—402.5)

It has been found that new condensation products are obtained when an amide, in which at lease one nitrogen atom, united to a carbonyl group, is combined with at least one hydrogen atom, is caused to react with a $\alpha:\alpha'$ dihalogenalkylether, and at least one water-solubilizing group is introduced into the condensation product, advantageously by treatment of the condensation product with a member of the group consisting of thio-ureas capable of reacting in the iso form, secondary and tertiary amines, cyclic compounds containing at least one basic nitrogen atom and at least one mercapto group, cyanamide, and dicyandiamide. The expression thioureas capable of reacting in the iso form is to be understood to comprise those which can react in the form of the atomic grouping

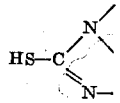

The express emphasis laid in the above first sentence on one particular group is justified for the reason that just the products obtained with the members of this group are characterized by especially valuable properties: that is, with all members of this group cationactive products may be obtained which possess the particularly valued property of being absorbed by the cellulose fiber. In particular, the products of higher molecular weight of the present invention, which have been made water-soluble by means of a member of the said group, possess a pronounced affinity for the cellulose fiber.

(1) Thus, for example, new condensation products are obtained if one mol of a $\alpha:\alpha'$-dihalogenether is caused to react with one mol of a carboxylic acid amide which contains at least one free hydrogen atom at the nitrogen atom of the carboxylic acid amide group, and which, if desired, contains an aliphatic or cycloaliphatic radical of higher molecular weight, and if one of the halogen atoms contained in the condensation product is exchanged for or converted into one of the groups conferring or increasing the solubility.

(a) As $\alpha:\alpha'$-dihalogenether can be used for example, $\alpha:\alpha'$dichlordimethylether.

The carboxylic acid amide which contains at least one free hydrogen atom at the nitrogen atom of the carboxylic acid amide group can, for example, be derived from aliphatic, cycloaliphatic or aromatic carboxylic acids, such an undecylenic, lauric, palmitic, stearic, or oleic acids, resinic or naphthenic acids, chloracetic, dichloraectic, $\alpha$-bromlauric, glycollic or lactic acids. Thus, for example, stearic acid amide, stearic acid-N-methylamide, stearic acid-anilide, stearic acid-o-toluidide, may be used.

(b) The reaction between the amides and the $\alpha:\alpha'$-dihalogenethers may be carried out by mixing at room temperature or at raised temperature, e. g., at 50–100° C., if desired in the presence of solvents, such as acetone, dioxane, chloroform, carbon tetrachloride, benzene. Treatment or heating is carried on until the splitting off of hydrogen halide is completed.

(c) The exchange of one of the halogen atoms contained in the condensation product of the carboxylic acid amide and the $\alpha:\alpha'$-dihalogenether for a group conferring water-soluble properties takes place by known methods. For example, a halogen atom can be converted by addition of tertiary amines into a group conferring water-soluble properties, that is to say, into a quaternary ammonium group. Such an addition can, for example, be carried out at room temperature or at a raised temperature, if desired in the presence of solvents. The reaction product, containing at least one reactive halogen atom, may also be caused to react with sodium thiosulphate or other thiosulphates, at room temperature or at raised temperature, if desired in the presence of solvents, such as water, alcohol, acetone, or mixtures of these. Thio-urea radicals, which in salt form can likewise bring about solubility in water, can be introduced by treatment of the above mentioned condensation products, containing reactive halogen atoms, with thiourea, if desired in presence of solvents, such as glacial acetic acid, for example at 80–100° C.

(2) A further possible method of obtaining condensation products of the type described in paragraph 1 of this introduction consists of first treating 1 mol of a primary carboxylic acid amide instead of with 1 mol with a least 2 mols of a $\alpha:\alpha'$-dihalogenalkylether. At least one halogen atom existing in the thus obtained condensation products can be converted according to known methods into a group conferring or increasing the water-solubility.

(a) The carboxylic acid amides mentioned in the last paragraph as being suitable for starting materials can, like the amides described under 1a belong to the aliphatic, aromatic, mixed aliphatic-aromatic, cycloaliphatic, or heterocyclic series. They can contain, if desired, a higher molecular aliphatic or cycloaliphatic radical. Into consideration come, for example, acetic, propionic, butyric, valeric, caproic, capric, lauric, myristic, palmitic, stearic, behenic acid amide; undecylenic, oleic, linoleic, linolenic acid amide, chloracetic, bromacetic, α-brom-lauric acid amide, benzoic, salicylic, naphthoic, oxynaphthoic acid amide, phenylacetic acid amide, hexahydrobenzoic acid amide, naphthenic and resinic acid amides, such as abietic acid amide.

The primary carboxylic acid amides to be applied by the process mentioned under (2) can also contain one of the groups conferring or increasing water-solubility, e. g., a sulphonic acid group or a quaternary ammonium group. Such starting products are at hand in, among others, benzamide-m-sulphonic acid, further in quaternary pyridinium bromide from α-brom-stearic acid amide.

The primary acid amides coming under consideration are either known or can be prepared directly according to analogous processes, e. g., from the corresponding carboxylic acid halides or carboxylic acid esters by means of ammonia.

(b) As α:α'-dihalogenalkylether, for example, α:α'-dichlordimethylether, α:α'-dibromdimethylether, α-chlormethyl- α'-chlorethylether, α:α'-dichlordiethylether can find application.

(c) The reaction between the primary carboxylic acid amides and the α:α'-dihalogendialkylethers can take place by mixing at room temperatures or at raised temperatures, e. g., at 50–100° C., if desired in the presence of solvents, such as chloroform, trichlorethylene, carbon tetrachloride, benzene, chlorbenzene. In general, it is advantageous to treat, or to heat, 1 mol of the carboxylic acid amide with 2 mols of the α:α'-dihalogen-alkyl-ether, preferably however with more than 2 mols of the dihalogenether, until the completion of the splitting off of the hydrogen halide. An excess of the α:α'-dihalogenalkylether can, at the end of the reaction, be easily removed by distillation, advantageously under reduced pressure.

(d) The new condensation products from 1 mol of a primary carboxylic acid amide and at least 2 mols of a α:α'-dihalogen-dialkylether are liquid or solid substances which contain very reactive halogen atoms. These active halogen atoms can be changed very easily into groups conferring water-soluble properties, e. g. into thiosulphuric acid groups, further into quaternary ammonium groups, furthermore into polyglycolether groups, in exactly the same manner as could the active halogen groups of the condensation products described in section 1. The active halogen atoms can also be replaced by amino or imino groups, or by thio-urea radicals, which groups, after conversion into the salt form also bring about water-solubility.

The conversion of an active halogen atom into a quaternary ammonium group can take place, for example, by addition of tertiary amines, such as trimethylamine, triethylamine, triethanolamine, pyridine, N-methylpiperidine. Such an addition can, for example, be brought about at room temperature or at a raised temperature, if necessary in the presence of solvents. Amino groups, or thio-urea radicals, can be introduced by warming the condensation products with amines, such as diethylamine, piperidine, or with thio-urea. In the last named reaction, the presence of solvents or of diluents is often advantageous. Thiosulphuric acid groups can be introduced by treatment of the aforementioned condensation products with sodium thiosulphate, or with other thiosulphates, at room temperature or at raised temperature, if necessary in the presence of solvents, such as acetone, alcohol.

The reactivity of the halogen atoms in the condensation products obtained from 1 mol carboxylic acid amide and at least 2 mols of a α:α'-dihalogendialkylether can also be utilized in such a manner that the active halogen atoms are not directly exchanged for groups which confer water-solubility but that the condensation products are made use of in other ways, as intermediate products in the preparation of dyestuffs, medical preparations, and the like.

(3) It has furthermore been established that valuable condensation products of the type described in paragraph 1 of the introduction are likewise obtained if the process described in section 2 is changed in such a manner that, for every primary carboxylic acid amide group, more than 1 mol but less than 2 mols of a α:α'-dihalogenalkylether is employed. It is advantageous if about 1.5 mol α:α'-dihalogenalkylether is allowed to react on every primary carboxylic acid amide group.

The statements made in section 2 concerning the choice of starting materials, conditions of reaction—naturally with the exception of the statements concerning the mol ratio of amide to dihalogenalkylether—further concerning the exchange of the halogen atoms contained in the condensation products for groups which confer water-solubility, can find unchanged application also by the process described in the previous paragraph.

(4) It has furthermore been found that valuable condensation products of the type described in paragraph 1 of the introduction can also be obtained if the condensation described under (1) of carboxylic acid amides, which contain at least one free hydrogen atom at the nitrogen atom of the carboxylic acid amide group, with α:α'-dihalogenethers is so carried out that, as carboxylic acid amides, compounds which contain at least one

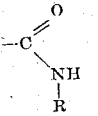

group, (R=a hydrocarbon radical or acyl radical substituted if desired), and as α:α'-dihalogenether, α:α'-dihalogenalkylethers are employed. In this reaction, for every

group, at least 1 mol α:α'-dihalogenalkylether, but advantageously an excess, may be appropriately employed. At least one of the halogen atoms present in the thus obtained condensation products may be converted, by known methods, into a group conferring or increasing the solubility in water.

(a) Among compounds which contain at least one

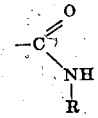

group (R=a hydrocarbon radical or acyl radical, substituted if desired), come under consideration, for example, carboxylic acid amides derived from primary amines, further ureas, urethanes and secondary carboxylic acid amides.

(b) The carboxylic acid amides, mentioned in the last paragraph as being suitable for use as starting materials, can be derived from primary amines and, as those amides described under 1/a and 2/a, from mono- or polybasic, saturated or unsaturated carboxylic acids of the aliphatic, aromatic, mixed aliphatic-aromatic, cycloaliphatic, or heterocyclic series; they can, if desired, contain a higher molecular aliphatic or cycloaliphatic radical. Into consideration come, for example, the amides derived from primary amines and from carboxylic acids, such as formic, acetic, propionic, butyric, valeric, caproic, capric, lauric, myristic, palmitic, stearic, behenic, undecylenic, oleic, linoleic, linolenic, chloracetic, bromacetic, α-bromlauric, succinic, adipic, maleic, benzoic, salicylic, oxynaphthoic, phenylacetic, phthalic, hexahydrobenzoic acids, further those from naphthenic and resinic acids.

Among the primary amines, from which are derived the mono-substituted carboxylic acid amides to be used according to the process described in this section, may be named: aliphatic amines, such as methyl-, ethyl-, propyl-, isopropyl-, butyl-, amyl-, hexyl-, dodecylamine, diethylaminoethylamine, ethanolamine, polyalkylpolyamines, such as triethylenetetramine; cycloaliphatic amines, such as cyclohexyl-, methylcyclohexylamine; aromatic amines, such as aniline, chloraniline, p-dimethylaminoaniline, toluidine, naphthylamines, e. g., β-naphthylamine; aliphatic-aromatic amines, such as benzylamine, and so on.

The N-monosubstituted carboxylic acid amides mentioned under (a) in this section can also contain a group conferring or increasing the water-solubility, e. g., a sulphonic acid group or a quaternary ammonium group. Such starting materials are to be found in 3-sulphobenzoic acid anilide, further in the quaternary pyridinium bromide derived from α-bromstearic acid-N-methyl-amide.

Here, also, the N-mono-substituted carboxylic acid amides mentioned in this section under (a) are either known or can be prepared according to analogous processes without difficulty, e. g. from the corresponding carboxylic acidhalides or esters by means of primary amines.

As ureas, such as were mentioned in this section under (a), such ureas are applicable as contain at least one substituent at at least one nitrogen atom and, besides, at least one free hydrogen atom in combination with one nitrogen atom. Into consideration come, for example, monomethyl-, monoethyl-, monophenyl-, monododecyl-, N:N'-dimethyl-, N:N'-diethyl, N:N'-diphenyl-, N:N'-didodecyl-urea.

As urethanes, such as were mentioned in this section under (a), such urethanes are applicable which contain at the most one substituent at the nitrogen atom. For example, the N-monosubstituted urethanes obtained from chlorformic acid esters with primary amines may be referred to.

The secondary carboxylic acid amides coming equally into consideration as starting materials for the foregoing process can be derived from the already mentioned carboxylic acids. Diacetamide, dibenzamide, dilauric-amide may be mentioned.

As α:α'-dihalogenalkylether can again, for example, find application α:α'-dichlordimethyl-ether, α:α'-dibromdimethyl-ether, α-chlor-methyl- α'-chlorethylether, α:α'-dichlordiethyl-ether.

The reaction between the compounds which contain a

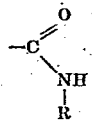

group, in which R has the meaning already specified, and the α:α'-dihalogendialkylethers can again be carried out by mixing at room temperature or at raised temperature, preferably at 50-110° C., if desired in the presence of solvents, such as chloroform, trichlorethylene, carbon tetrachloride, benzene, chlorbenzene. For every

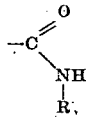

group, at least 1 mol α:α'-dihalogenalkylether, but advantageously an excess, may be appropriately employed, and treatment, or heating, is carried out until the splitting-off of hydrogen halide is finished. After the reaction is complete, an excess of α:α'-dihalogenalkylether can be easily removed by distillation, suitably under reduced pressure.

The condensation products derived from compounds possessing the mentioned

group and from α:α'-dihalogenalkylethers have similar properties to those products described in section 2 under (d), and accordingly the reactive halogen atoms present in the condensation products may be very easily exchanged for other groups, particularly for groups conferring water-solubility, according to the methods given in the place just mentioned.

(5) It has furthermore been observed that valuable condensation products of the type described in the first paragraph of the introduction are obtained if as carboxylic acid amides, which are to be treated with α:α'-dihalogenalkylethers, N:N'-diacylated methylendiamines, which contain at least one hydrogen atom combined with a nitrogen atom of the methylenediamine are used. At least one of the halogen atoms present in the condensation product thus obtained may be converted by known methods into a group conferring or increasing water-solubility.

Among N:N'-diacylated methylenediamines, methylenediamides come first of all into consideration as starting materials. On the other hand, methylenediurethanes, ureas with the atomic grouping

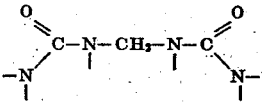

as well as condensation products of methylolamides with ureas, may be used.

As methylenediamides there may be used, for example, methylenediformamide, methylene diacetamide, methylene-bis-monochloracetamide, methylene-bis-trichloracetamide, methylene-diisovaleramide, methylene-bis-diethylacetic-acid-amide.

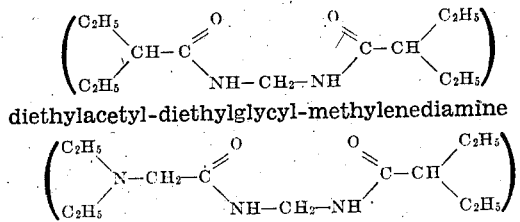

diethylacetyl-diethylglycyl-methylenediamine methylenedistearic amide, methylenedibenzamide, methylenebenz-salicyl-amide. Very generally, all such symmetrical or unsymmetrical methylenediamides come into consideration as starting materials as again may be derived from mono- or polybasic, saturated or unsaturated carboxylic acids of the aliphatic, cycloaliphatic, aromatic, mixed aliphatic-aromatic, or heterocyclic series. Among these carboxylic acids may be named: propionic, butyric, caproic, caprylic, capric, lauric, myristic, palmitic, stearic, behenic acids; undecylenic, oleic, linoleic, linolenic acids; succinic, adipic, maleic acids; chloracetic, bromacetic, α-bromlauric acids; benzoic, salicylic, naphthoic, oxynaphthoic acids; phthalic acid; phenylacetic acid; hexahydrobenzoic acid; resinic and naphthenic acids. The methylene amides not already described in the literature can be prepared by anologus processes, for example, by the heating of carboxylic acid amides in glacial acetic acid solution with formaldehyde and concentrated sulphuric acid, or by treatment of methylolamides with mineral acids. Unsymmetrical, higher molecular methylenediamides are also available according to the process described in the U. S. Patent No. 2,279,497.

As methylenediurethanes may be used, for example, methylenediurethane

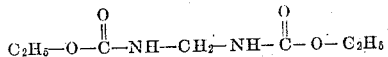

as well as homologous methylenediurethanes which are obtainable by analogous methods from the carbamic acid esters, such as carbamic acid-n-octylester, carbamic acid-n-dodecylester.

Among the ureas with the atomic grouping

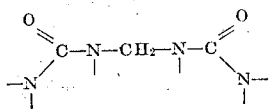

come into consideration, for example, methyene-bis-monoethylurea

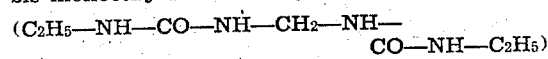

methylene-bis-α:α-dimethylurea

further the urea derivatives obtainable by analogous methods from aryl ureas or from the higher molecular alkyl ureas.

As condensation products of methylolcarboxylic acid amides with ureas, which may contain the atomic grouping

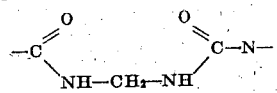

and thus can give rise to unsymmetrical, diacylated methylenediamines, use can be made of those urea condensation products which are described in U. S. Patent No. 2,279,497, e. g., that obtained from urea and methylol-stearic acid amide.

The diacylated methylenediamines to be used as starting materials can also contain a group conferring or increasing the solubility in water, e. g., a sulphonic acid group or a quaternary ammonium group.

As α:α'-dihalogenalkylethers, α:α'-dichlordimethylether, α:α'-dibromdimethylether, α-chlormethyl-α'-chlorethylether, α:α'-dichlordiethylether can again find application.

The reaction between the diacylated methylenedialkylethers can here also be carried out by mixing at room temperature or at raised temperature, preferably at 50–110° C., if desired in the presence of solvents, such as chloroform, trichlorethylene, carbon tetrachloride, benzene, chlorobenzene. For every

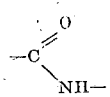

group, at least 1 mol α:α'-dihalogenalkylether is preferably used, advantageously an excess, and treatment or heating is carried out until the splitting off of the hydrogen halide is completed. An excess of α:α'-dihalogenalkylether can easily be removed at the end of the reaction by distillation, preferably under reduced pressure.

The condensation products obtained from the diacylated methylenediamines and the α:α'-dihalogenalkylethers possess similar properties to the products described in section 2 under (d), and accordingly the reactive halogen atoms present in these condensation products are very easily exchanged for other groups, particularly for groups conferring water-solubility, by methods given in the above-mentioned section. Thereby not only thio-ureas but also other thio-urea compounds which contain the atomic grouping

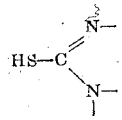

e. g., N-monomethyl-, N-monoethyl-, N-phenyl-, N:N'-dimethyl-, N:N'-diethylurea, monothiobiuret (NH$_2$—CO—NH—CS—NH$_2$), may be used in the reaction with the condensation products containing the reactive halogen atoms.

(6.) Finally, it has still further been observed that valuable condensation products of the type described in the first paragraph of the introduction are obtained if, in the condensation products derived from α:α'-dihalogenalkylethers and from amides, already described, containing at least one free hydrogen atom at at least one nitrogen atom combined with a carbonyl group, at least one halogen atom is exchanged for a group conferring water-soluble properties and which contains a cyanamide or a dicyanadiamide radical, or which exhibits a radical of a cyclic compound containing at least one basic nitrogen atom as well as at least one mercapto group.

As examples of cyclic compounds containing at least one basic nitrogen atom as well as at least one mercapto group, use may be made of 2-mercapto-thiazoline or 4-methyl-2-mercapto-thiazole.

The exchange of one of the halogen atoms, contained in the above-mentioned condensation products, for a group conferring water-soluble properties which contains a cyanamide or dicyandiamide radical, or which exhibits the radical of a cyclic compound containing at least one mercapto group, can be carried out by treatment of the condensation product, derived from the amides and the α:α'-dihalogenalkylethers, with cyanamide or dicyandiamide, or, on the other hand, with the mercapto compounds mentioned in the last paragraph, at room temperature or at slightly raised temperature, e. g., at 40-45° C. It is thereby preferable to use a solvent, for example, acetone.

(7.) The products obtained according to the present invention can find application among other uses as auxiliary products, for example, in the textile, leather and paper industries, if the choice of the starting products is suitable. By reason of their surface-tension reducing properties, those water-soluble products which contain a higher molecular aliphatic or cycloaliphatic residue are wetting-, softening-, water-resisting-, and foaming-agents. The solubility of the process products can be raised by addition of hydrotropic substances, e. g., ureas, thio-ureas, further by addition of capillary-active substances, e. g., salts of diethylamino-ethyl-oleic acid amide.

The constitution of the products obtained according to the present invention could not be determined with certainty owing to the ease of decomposition of the intermediate- and end products. It is certainly to be assumed that the group conferring water-soluble properties is united to a nitrogen atom combined with a carbonyl group by means of a bridge, of a type not yet determined, which is derived from the α:α'-dihalogenalkylether used. However, the products of the present invention can only be distinguished with certainty by their methods of preparation.

The particular interest of the products obtainable by the present invention lies in their property of being able to dissociate when heated or treated with saponifying agents, whereby insoluble bodies can be precipitated. If this dissociation takes place on a substrate, as, for example, textile materials, which, for example, can consist of cellulose or of animal fibres, then this insoluble body is precipitated in a strongly-adhering form. According to its nature, it can bestow upon the fiber definite valuable properties. Among these may be stressed the properties of water-impermeability or water-repellancy, both fast to washing, with which, according to the choice of the starting materials an especial softness and fullness may be connected, which latter properties may be enhanced by the addition of particular filling agents. A strong reduction of the hygroscopicity and an increase in the isolating properties against heat and electricity can further be achieved. As further properties which may be bestowed upon the fiber may be mentioned resistance against creasing, stability to the shifting of the warp and weft, reduction of luster, increase in fastness to water, diminution of shrinkage of the fabric, and, in the case of wool, prevention of felting. Further by local application of the process, calender-, matt- and damask-effects, colored effects due to the altered dyestuff-absorbent powers of the fiber, may be obtained. If the process is carried out on dyed materials, the properties of the dyeings, such as their fastness to light, rubbing, washing and water, may thus be appreciably increased. These different effects may be combined together. Condensation products which contain a higher molecular radical, e. g., an alkyl radical with 16-18 carbon atoms, are especially suitable for producing on textile materials water-repellant effects which are fast to washing. To this end, the impregnated and dried material is heated for a short time, e. g., to 110-140° C. In many cases, particularly when use is made of condensation products which contain a thio-urea radical, hydrophobic properties which are fast to washing are already obtained after drying the material at 75-100° C.

If the carboxylic acid amides used for the condensation have been dyestuffs or intermediate products for the manufacture of dyestuffs, it then becomes possible to bring the new products on to the fiber and thereupon to subject them to the dissociation, by which the dyestuffs or the intermediate products become fixed on the fiber, whereupon the latter can be developed into dyestuffs if required.

The products obtained by means of the process described in section 4, especially those which contain thio-urea radicals, may be utilized to increase the affinity of fibers towards anion-producing substances, such as acid dyestuffs. In this manner, basic fibers, or fibers of an increased basic character, may be obtained. To this end, the textile material, consisting of cellulose or of animal fibers, can be impregnated with solutions or dispersions of the condensation products, if required in the presence of catalysts or of the salts of weak acids, and, after drying, can be subjected to a heating after-treatment. As solvent or dispersing medium, water is preferably used, particularly for the low-molecular substances. However, organic solvents may also be used. The manner of heat-aftertreatment is dependent on the type of fiber material and the constitution of the condensation products used. Cellulose material which has been impregnated with thio-urea derivatives may be heated, for example, about 15 minutes at 110° C. or several minutes at 140° C.

Materials, particularly those textile fabrics which consist of cellulose or which contain cellulose, which have been treated in the specified manner may be dyed in deep, fast shades by acid dyestuffs which contain metals in complex combination, mordant dyestuffs especially, however, by sulphuric acid ester salts of vat dyestuffs and by dyestuff esters or amides, such as those described in French Patent Specifications No. 815,-575 and No. 828,532. Dyestuff intermediate products of an acid character are also absorbed by cellulosic material which has been treated in the manner described.

Direct dyestuffs yield, on cellulosic materials treated in the specified manner, dyeings which are, in general, faster to washing than corresponding dyeings made on untreated cellulose, which fact in all probability, is to be traced to a salt formation. The acid dyestuffs absorbed by the pre-treated cellulosic materials, should their chemical constitution be appropriate, can be diazotized and developed with azo-components on the fiber in the usual manner. Suitable dyestuffs may also be treated on the fiber with diazonium compounds.

The products of the present invention can be applied alone or together with other substances, such as salts, especially those of weak acids, for example, sodium acetate, aluminium formate, further together with carbohydrates, such as paraffin, solvents, soaps, soap-like substances, protective colloids, finishing materials, such as methylol-ureas, weighting-, softening- or delustering materials, and so forth.

The following examples illustrate the invention:

Example 1

12 parts by weight of stearic-acid-N-methylamide are mixed with 20 parts by weight of symmetrical dichlor-dimethylether and heated for 3 hours with stirring at 90–100° C. with exclusion of humidity. After this time, the generation of hydrogen chloride, which at first takes place strongly, is complete. The clear solution is poured off from any small quantity of precipitated resin, and the excess of dichlor-dimethylether is removed by vacuum distillation. 10 parts by volume of pyridine are now poured over the residual colorless, waxlike mass, whereupon the whole is warmed. After heating for 20 minutes on the steam bath, a test portion gives a clear solution in water. After removal of the excess of pyridine by vacuum distillation, the new product remains as a colorless, waxlike mass. The aqueous solution foams strongly and decomposes gradually on boiling. The new product corresponds probably to the formula

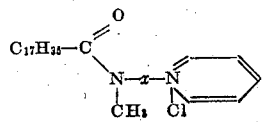

wherein $x$ stands for a bridge derived from $\alpha:\alpha'$-dichlor-dimethyl-ether.

Example 2

28 parts by weight of symmetrical dichlor-dimethylether are added to 14.1 parts by weight of stearic-acid amide with constant stirring and with exclusion of humidity whereupon the mixture is heated for 4 hours at 85–95° C. A strong generation of hydrogen chloride gas sets in at first, which gradually decreases and, after the given time, is fully completed. The excess of dichlor-dimethylether is then removed by distillation, finally under reduced pressure.

23 parts by weight of a colorless, wax-like mass result, possessing reactive halogen atoms, which permit the use of the product in the most diverse condensations. It corresponds probably to the formula

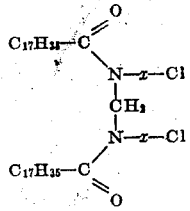

wherein $x$ stands for a bridge derived from $\alpha:\alpha'$-dichlor-dimethylether.

The same product may be obtained if, in place of an excess of dichlorether, as given above, approximately the calculated quantity, i. e., 2 mols, is used.

Similar products may be obtained if, in place of the stearic-acid amide, the amides of hardened fish oil fatty acids are used.

Example 3

15 parts by weight of lauric-acid-amide are heated while stirring together with 30 parts by weight of symmetrical dichlor-dimethylether for 5 hours on the steam bath. After working-up the reaction mixture in the manner described in Example 2, the reaction product remains as a half-solid fatty mass, which possesses similar properties to the product obtained in Example 2.

In a similar manner, the reaction may be carried out with butyric-acid-amide, whereby a colorless oil is obtained as reaction product.

Example 4

12 parts by weight of benzamide and 24 parts by weight of symmetrical dichlordimethylether are heated for 8 hours at 90–95° C. with stirring. The small excess of dichlordimethylether is then removed by distillation under reduced pressure, whereupon the reaction product remains behind as a thick-flowing, colorless mass.

The new compound possesses extraordinarily reactive halogen atoms and may be used, as is shown below, in further exchange reactions.

Example 5

220 parts by weight of the condensation product of stearic-acid-amide with sym. dichlordimethylether, obtained as described in Example 2, is gradually added at 20° C., while stirring, to a suspension of 91 parts by weight of finely powdered thio-urea in 800 parts by volume absolute alcohol. The temperature is allowed to rise to 45–50° C., and this temperature is maintained for about ½ hour, during which period the thio-urea gradually dissolves, and a colorless, clear solution results. As soon as a test portion of this solution remains quite clear when diluted with water, the reaction is complete. After removal of the alcohol by vacuum distillation at 40–50° C., the condensation product remains originally as a sticky mass, which on cooling down to 0° C., solidifies and then yields an easily powdered mass.

The new product is a white powder, which dissolves in warm water to a strongly foaming solution, which latter, especially after the addition of sodium acetate, decomposes after short boiling with the deposition of an insoluble, amorphous product. The new product corresponds probably to the formula

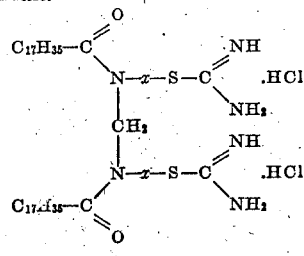

wherein $x$ stands for a bridge derived from $\alpha:\alpha'$-dichlor-dimethyl-ether.

An impregnation bath may be prepared in the following manner:

10 parts by weight of the product described above are pasted with 10 parts by volume of alcohol, whereupon 100 parts by volume of water at 70° C. are added to the alcohol-moist product. A clear solution is at once obtained, which is then made up to 1000 parts by volume with cold water. 3 parts by weight of sodium acetate are then added to the solution thus obtained, whereupon cotton poplin, previously dyed with 3% Direct Sky Blue GS is padded through this treating-bath, being given two passages. The material, so squeezed that it retains 100% of its own weight of the liquor, is dried at 75° C. and subjected to a heating treatment at 100–140° C. for 4 minutes. The material thus obtained is outstandingly soft and water-repellent, properties which resist both washing with soap-solutions and washing with carbon-tetrachloride.

Example 6

4.4 parts by weight of the condensation product of stearic-acid-amide with sym. dichlordimethylether, obtained as described in Example 2, are stirred with 1.8 parts by weight of pyridine for 10 minutes at water-bath temperature. A test portion of the tough, colorless mass is then found to be soluble in water, giving a clear foaming solution. After cooling, the melt solidifies to a pulverable mass, which, by trituration and washing with ether may be freed from small quantities of adhering pyridine.

The new product thus obtained forms a white powder which is easily soluble in water, giving an aqueous solution which, particularly after addition of sodium acetate, is gradually decomposed by boiling.

The new product corresponding probably to the formula

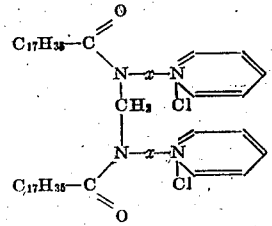

wherein $x$ stands for a bridge derived from $\alpha:\alpha'$-dichlordimethylether, can be used in the finishing of textiles in the manner described in Example 5.

Example 7

4.4 parts by weight of the condensation product obtained from stearic-acid-amide and sym. dichlordimethylether as described in Example 2 are gradually added with constant stirring to 10 parts by volume of piperidine, cooling at the same time. When no further heat of reaction is observed the reaction mixture is heated for a short time on the steam bath. After cooling down, the piperidine solution is diluted with ether, whereby the reaction product separates out as a solid mass, which is removed and washed with ether in order to get rid of the last traces of piperidine. A colorless solid mass remains, which gives a clear solution in dilute acids. The aqueous solution decomposes after heating for a short time with separation of an insoluble product. The new product corresponds probably to the formula

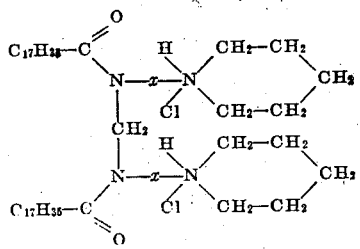

wherein $x$ stands for a bridge derived from $\alpha:\alpha'$-dichlordimethylether.

Example 8

225 parts by weight of the condensation product derived from the amide of a hardened fish oil fatty acid and sym. dichlordimethylether, which is prepared as described in Example 2, are warmed gently with 100 parts by volume of chloroform until a clear solution results, whereupon this solution is run, with stirring, into a suspension of 91 parts by weight of finely powdered thio-urea in 650 parts by weight of absolute alcohol at 20° C. The temperature rises to 45° C. and is maintained at 50–55° C. for 25 minutes. After this time, a test sample of the clear solution is soluble in water, giving a foaming solution. After removal of the alcohol-chloroform mixture by vacuum distillation at 40–50° C., the new product is obtained in the form of a mass which solidifies on cooling and becomes pulverable. The product is easily soluble in alcohol. The concentrated alcoholic solution, on dilution with water, gives a clear, foaming solution, which decomposes at the boil with separation of an insoluble fatty substance.

The new product corresponding probably to the formula

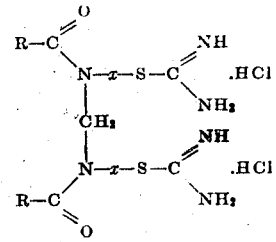

wherein R stands for the alkyl radical contained in the hardened fish oil fatty acid and $x$ stands for a bridge derived from $\alpha:\alpha'$-dichlordimethylether may be used in the finishing of textiles according to the method given in Example 5.

Example 9

18.2 parts by weight of finely powdered thiourea are suspended in 120 parts by volume of absolute alcohol. At 20° C. the condensation product obtained from 27.7 parts by weight of benzamide and sym. dichlordimethylether, prescribed in Example 4, is added slowly, while stirring, whereupon the temperature rises to 35° C. After ¾ hour heating to 40–45° C., a test sample of the alcoholic solution gives a clear solution in water. The reaction product may be easily isolated by precipitation by ether. It separates as colorless, tough mass, easily soluble in water, which solidifies on being allowed to stand for some time in a vacuum. The new product corresponding probably to the formula

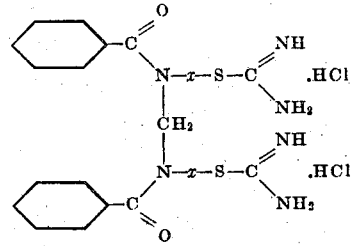

wherein $x$ stands for a bridge derived from $\alpha:\alpha'$-dichlordimethylether, is very easily soluble in water. After a short boiling, the aqueous solution becomes turbid due to separation of decomposition products.

Example 10

3 parts by weight of p-stearoylamino-benzamide together with 10 parts by weight of dichlordimethylether are heated with stirring for 20 hours in a bath at 110–120° C., whereupon the greater part of the starting material has gone into solution. After vacuum distillation of the excess dichlordimethylether, 10 parts by weight of pyridine are run in, and the whole is warmed, with stirring, for 20 minutes on the steam bath. After removal of the excess pyridine, a yellowish-coloured, soft mass is obtained, which gives a clear, strongly foaming solution in water. By heating the aqueous solution, particularly after addition of sodium acetate, the foaming properties gradually disappear, and amorphous, insoluble decomposition products separate out.

The new product may be employed in the finishing of textiles in the manner described in Example 5.

Example 11

199 parts by weight of lauric-acid-amide are heated with stirring with 171 parts by weight of symmetrical dichlordimethylether for 3 hours in an oil bath at 90–100° C. The reaction proceeds with the evolution of hydrochloric acid gas and is finished when a test sample, after heating with pyridine for a short time, yields a clear, foaming solution. The new product is a half-solid, colorless mass, which is easily soluble in organic solvents and which possesses very reactive chlorine atoms.

Example 12

256 parts by weight of $\alpha:\alpha'$-dichlordimethylether and 150 parts by weight of the amide derived from hardened fish oil fatty acids are heated with stirring in a bath at 90–100° C. A clear solution is first formed, from which, from time to time, insoluble portions separate, whereby the reaction mixture thickens. When the reaction mass again becomes thin-flowing, a further 150 parts by weight of the amide derived from hardened fish oil fatty acids are added. The reaction mixture which becomes thick at first gradually thins by further stirring, whereupon a further 150 parts by weight of the amide from hardened fish oil fatty acids are added. After stirring for a further 2–3 hours in a bath at 95–100° C., the reaction is complete, which may be recognised by the fact that a test sample, after heating for a short time with pyridine, is soluble in water, giving a clear solution which foams on shaking. The new condensation product is a wax-like mass which is easily soluble in the usual organic solvents and which is decomposed by hot water. It contains very reactive chlorine atoms and may be used in the most varying reactions.

Example 13

1 part by weight of the condensation product obtained according to Example 1 is heated with 2 parts by weight of pyridine for a short time on the water bath until a test sample gives a clear solution in water. After removal of the pyridine by distillation under reduced pressure, the quaternary ammonium salt is obtained in the form of an almost colourless mass, soluble in water to a clear solution which foams on shaking.

Example 14

195 parts by weight of finely powdered thio-urea are suspended in 1500 parts by volume of acetone. In the course of 1 hour, a solution of 630 parts by weight of the condensation product obtained according to Example 2 dissolved in 500 parts by volume of acetone is run in at about 5–10° C. Stirring is carried out at room temperature, or at about 40° C., until a test sample of the separated condensation product dissolved in a little alcohol gives a clear solution when diluted with water. After filtering with suction and drying, which is preferably carried out at a low temperature and under reduced pressure, the reaction product is obtained in the form of a solid, pulverable mass which, on being dissolved in a little alcohol, gives a clear solution on dilution with water, which decomposes on boiling. This decomposition, which proceeds with the separation of insoluble products, is accelerated by the addition of sodium acetate. The new product corresponding probably to the formula indicated in Example 5 is particularly suitable for the production of fast-to-washing water-repellent effects on textiles, which may be obtained according to the process described under Example 5.

Example 15

24.2 parts by weight of formanilide are heated with stirring with 69 parts by weight of $\alpha:\alpha'$-dichlordimethylether at 100–105° C., and the reaction mixture is maintained at this temperature for about 20 hours until the reaction is complete. By this time the reaction product has separated out as a light coloured substance. Hereupon, the excess of ether is removed by vacuum distillation.

41 parts by weight of this reaction product are dissolved in 100 parts by volume of alcohol and a solution of 18.2 parts by weight of thio-urea in 90 parts by volume of alcohol is added. The temperature of the reaction mixture is maintained at 45° C., and, after a short time, the reaction product begins to separate as a resinous mass. After the reaction mixture has been allowed to stand for some hours longer, the whole reaction mass is evaporated to dryness in a vacuum.

The new product obtained in this manner forms a yellowish powder, which is easily soluble in water to a clear solution. When sodium acetate is added to the solution of the new product, insoluble basic decomposition products separate on heating. Dyestuffs containing sulphonic groups are immediately completely precipitated from their aqueous solutions by an aqueous solution of this new product.

Example 16

135 parts by weight of acetanilide are heated with stirring with 345 parts by weight of $\alpha:\alpha'$-dichlordimethylether at 100–105° C., whereby the acetanilide soon goes into solution, and after a short time a reaction sets in, with splitting-off of hydrochloric acid. After about 20 hours reaction period, the reaction is almost complete. Hereupon the excess of ether is removed by vacuum distillation, whereby the new product remains behind as a yellowish powder. The increase in weight represents the taking-up of 1 mol dichlordimethylether.

210 parts by weight of the reaction product of acetanilide with dichlordimethylether are dissolved with stirring in 500 parts by volume of cold alcohol and a solution of 91 parts by weight of thio-urea in 800 parts by volume of hot alcohol are run in. The temperature of the reaction mixture is maintained at about 50° C., and, after a short time, the new reaction product begins to separate out as a resinous mass. After standing for some hours, the whole reaction mass is evaporated to dryness in vacuo. The new reaction product obtained in this way is a light-coloured powder, which is easily soluble in water, giving a clear solution, and which possesses the property of precipitating compounds which contain sulphonic groups from their aqueous solutions. On adding sodium acetate to the solution of this new product and heating, a difficultly-soluble decomposition product separates. Addition of dilute alkalies to the cold aqueous solution of the product causes immediate separation of a difficultly-soluble base, which re-dissolves on addition of dilute acid.

Example 17

21 parts by weight of the reaction product, obtained according to Example 16 from acetanilide and $\alpha:\alpha'$-dichlordimethylether, are gradually added at 100° C., with stirring, to 40 parts by weight of pyridine. A tough reaction mixture results, which is rather difficult to stir. The reaction product is kept at 100° C. until a test sample gives a clear solution in water. Hereupon the whole reaction mass is evaporated to dryness in vacuo.

The new reaction product obtained in this way is a yellowish hygroscopic powder, which is easily soluble in water to a clear solution. On heating the aqueous solution of the product with dilute alkalies, a difficultly soluble decomposition product separates.

Example 18

17.8 parts by weight of p-acetamidodimethylaniline are heated with stirring at 100–105° C. with 34.5 parts by weight of $\alpha:\alpha'$-dichlordimethylether. The p-acetamidodimethylaniline goes gradually into solution and the splitting off of hydrochloric acid soon begins. As the reaction continues, the reaction mixture becomes gradually more thick-flowing, and, after about 15 hours, the mass is so viscous that stirring is made impossible. Hereupon the excess of ether is removed by vacuum distillation.

27 parts by weight of this reaction product are dissolved in 100 parts by volume of cold alcohol, and to this solution, a solution of 9.1 parts by weight of thio-urea in 70 parts by volume of hot alcohol is added. The new reaction product separates immediately. After the reaction mixture has been allowed to stand for some little time, the whole reaction mass is evaporated to dryness in vacuo.

The new reaction product obtained in this manner is a brownish powder, readily soluble in water to a clear solution. On heating the solution of the new product to which sodium acetate has been added, a difficultly soluble decomposition product separates out.

Example 19

13 parts by weight of acetylamylamine are heated with stirring at 100–105° C. with 23 parts by weight of $\alpha:\alpha'$-dichlordimethylether, and the reaction mixture is maintained at this temperature for about 30 hours until the reaction is complete. Hereupon, the excess of ether is removed by vacuum distillation.

18.4 parts by weight of this reaction product are now dissolved in 100 parts by volume of cold alcohol, and to this is added a solution of 9.1 parts by weight of thio-urea in 70 parts by volume of hot alcohol. The temperature of the reaction mixture is maintained at 40° C.: no separation of the reaction product takes place. After the reaction mixture has been allowed to stand several hours, and a test sample gives a clear solution in water, it is evaporated to dryness in vacuo.

The new reaction product obtained in this manner forms a brown, hygroscopic, resinous mass, which readily gives a clear solution in water.

On warming an aqueous solution of the new product to which sodium acetate has been added, insoluble, basic decomposition products separate out.

Example 20

7 parts by weight of acetylcyclohexylamine are heated with stirring at 100–105° C. with 17.2 parts by weight of $\alpha:\alpha'$-dichlordimethylether, and the reaction mixture is maintained at this temperature for about 20 hours until the reaction is complete. Hereupon the excess of ether is distilled off in vacuo.

6.6 parts by weight of this reaction product are dissolved in 10 parts by volume of cold alcohol and a solution of 2.7 parts by weight of thiourea in 25 parts by volume of hot alcohol are run in. The temperature of the reaction mixture is maintained at 45° C.: no separation of the reaction product takes place. After the reaction mixture has been allowed to stand for some hours, and a test sample of the reaction mixture gives a clear solution in water, it is evaporated to dryness in vacuo.

The new reaction product obtained in this manner forms a brown hygroscopic powder which dissolves easily in water to a clear solution.

The aqueous solution of the new product to which sodium acetate has been added separates insoluble decomposition products on heating.

Example 21

15 parts by weight of propionic-acid-anilide are heated with stirring at 100–105° C. with 34.5 parts by weight of $\alpha:\alpha'$-dichlordimethylether, whereby the propionic-acid-anilide soon goes into solution, and after a short time the reaction sets in with splitting off of hydrochloric acid. After about 24 hours' reaction time, the reaction is almost complete, whereupon the excess of ether is removed by vacuum distillation.

23 parts by weight of this reaction product are now dissolved in 80 parts of cold alcohol and a solution of 9.1 parts by weight of thio-urea in 70 parts by volume of hot alcohol are added. The temperature of the reaction mixture is maintained at 45° C., and, after some time, the reaction product begins to settle out as a resinous mass. After the reaction mixture has been allowed to stand some hours longer, the whole reaction mass is evaporated to dryness in vacuo.

The new reaction product obtained in this manner is a yellowish powder which is easily soluble in water to a clear solution. The solution of the product to which sodium acetate has been added deposits insoluble basic decomposition products on heating.

Example 22

12 parts by weight of stearic-acid-N-methylamide and 20 parts by weight of symmetrical dichlordimethylether are heated together with stirring but with exclusion of humidity for 3 hours at 90–100° C. After this time, the evolution of hydrogen chloride, which was at first strong, is practically complete. The clear solution is poured off from any small amount of separated resin, and the excess of dichlor-dimethylether is removed by vacuum distillation. The remaining colorless, wax-like mass is covered by pouring over it 10 parts by volume of pyridine, whereupon generation of heat takes place. After heating 20 minutes on the steam bath, a test sample gives a clear solution in water. After distilling off the excess pyridine in vacuo, the new product remains as a colourless, wax-like mass. The aqueous solution foams strongly and is decomposed gradually by boiling.

Example 23

12 parts by weight of N-methyl-stearic-acid-amide and 24 parts by weight of symmetrical dichlordimethylether are heated together with stirring for about 4 hours at 100° C. By this time the evolution of hydrochloric acid gas is complete, and the excess of dichlorether is removed by vacuum distillation at the same temperature. The residue is dissolved cold in 30 parts by volume of absolute alcohol and the solution is slowly added, with stirring, at 10–20° C. to a suspension of 8 parts by weight of thio-urea in 100 parts by volume of absolute alcohol. After all has been added, the mixture is heated 45 minutes at 50–60° C. and the alcohol removed by distillation in vacuo. A half-solid mass is obtained which, when dissolved in a little alcohol and diluted with water, gives a solution which foams on shaking and which decomposes at the boil. The new product corresponds probably to the formula

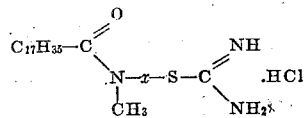

wherein $x$ stands for a bridge derived from $\alpha:\alpha'$-dichlordimethylether.

Example 24

29 parts by weight of stearic-acid anilide and 60 parts by weight of symmetrical dichlordimethylether are heated together for 4 hours in an oil bath at 110–120° C. After this time, the evolution of hydrochloric acid gas, which was at first violent, is complete. After the removal of the excess of dichlorether by vacuum distillation on the steam bath, the reaction product is cooled and dissolved in 70 parts by volume of absolute alcohol. The solution is slowly run into a suspension of 16 parts by weight of finely powdered thio-urea in 150 parts by volume of absolute alcohol at 10–20° C., stirring all the time. After all has been added, it is heated 45 minutes at 50–60° C. and the alcohol removed by vacuum distillation at the same temperature. The condensation product remains behind as a tough mass, which, on cooling, may be pulverised. A test sample dissolved in a little alcohol and diluted with water yields a clear, foaming solution, which is gradually decomposed by boiling.

Example 25

32 parts by weight of stearic-acid-α-naphthylamide and 60 parts by weight of symmetrical dichlordimethylether are heated together with stirring for 2 hours on the the oil bath at 110–120° C., whereupon the evolution of hydrochloric acid gas, which is at first vigorous, is completed. After removal of the excess dichlorether by vacuum distillation, the cooled residue is mixed with 80 parts by volume of absolute alcohol. This solution is slowly added at 10–20° C. with stirring to a suspension of 16 parts by weight of thio-urea in 160 parts by volume of absolute alcohol and the whole is heated for 90 minutes at 50–60° C., when a test sample gives a clear, foaming solution on dilution with water. After removal of the alcohol by vacuum distillation, the new product is obtained as a tough mass, which solidifies on cooling and may then be broken up.

Example 26

4.2 parts by weight of the azo dyestuff derived from mono-acetyl-m-phenylenediamine and 2:3-oxynaphthoic-acid-anilide are heated with 23 parts by weight of $\alpha:\alpha'$-dichlordimethylether with stirring at 100–105° C. After a short time, the reaction commences with evolution of hydrochloric acid gas and the dyestuff goes gradually into solution as the reaction proceeds. After a reaction time of about 20 hours, the excess ether is removed by vacuum distillation.

6.3 parts by weight of this reaction product are mixed with 20 parts by volume of cold alcohol and a solution of 2.2 parts by weight of thio-urea in 20 parts by volume of alcohol is run in. The reaction mixture is then heated, with stirring, at 40° C. After a reaction time of some hours, the reaction product is separated from the alcohol and dried.

The condensation product obtained in this manner forms a brown powder which dissolves in water to give a yellow-brown solution. On heating the aqueous solution with dilute alkalies, an insoluble brown dyestuff is deposited.

Example 27

10 parts by weight of viscose slubbing are treated for 30 minutes at 20° C. in a bath consisting of 100 parts by volume of water, 3 parts by weight of the condensation product derived from formanilide $\alpha:\alpha'$-dichlordimethylether, and thio-urea according to the method given in Example 15, and 5 parts by weight of sodium acetate crystals. The slubbing is hydro-extracted, dried at 60° C. for 1 hour, heated to 110° C. for 15 minutes, rinsed cold for 5 minutes, and again hydro-extracted.

The slubbing treated in this manner is dyed in the following dyebath: 0.5 part by weight of the condensation product derived from m-benzoylchloride-sulphonic-acid and the azo dyestuff derived from diazotised 2:5-dichloraniline and 2:3-oxynaphthoic-acid-o-anisidide are dissolved in 200 parts by volume of water and to this solution are added 1 part by volume of 10% acetic acid and 5 parts by weight of anhydrous sodium sulphate. The slubbing is entered at 40° C., the bath temperature raised to 90° C. in 15 minutes and dyeing continued at this temperature for a further 45 minutes. Hereupon, the slubbing is hydroextracted, worked for 10 minutes in a cold bath containing 5 ccm. caustic soda 36° Bé. and 50 gms. sodium chloride per litre, rinsed and soured with 5 ccm. hydrochloric acid per litre. It is then rinsed, soaped for 15 minutes at 70° C. (3 gm. soap per litre), again rinsed and dried. A strong scarlet shade is obtained.

Example 28

10 parts by weight of bleached cotton sateen are worked for 30 minutes at 30° C. in a bath composed of 100 parts by volume of water, 5 parts by weight of the condensation product derived from acetanilide, $\alpha:\alpha'$-dichlordimethylether and thiourea according to Example 16 and 5 parts by weight of sodium acetate crystals. Hereupon the fabric is hydro-extracted, dried for 1 hour at 70° C. and then heated for a further 15 minutes at 110° C.

This pre-treated cotton piece is dyed in the following bath: 1 part by weight of the condensation product derived from m-benzoylchloride-sulphonic-acid and the azo dyestuff obtained from diazotized 2:5-dichloraniline and 2:3-oxy-naphthoic-acid-o-anisidide are dissolved in 200 parts by volume of water, and, to this solution, 1 part by volume of acetic acid 10% and 5 parts by weight of anhydrous sodium sulphate are added. The cotton is entered at 60° C., the bath temperature raised in 15 minutes to 95° C. and dyeing continued at this temperature for a further 45 minutes. Hereupon, the material is hydro-extracted, worked for 10 minutes in a cold bath containing 50 ccm. caustic soda 36° Bé. and 50 gm. sodium chloride per litre, rinsed, and soured with 5 ccm. per litre hydrochloric acid. It is then rinsed for 5 minutes at 80° C. and soaped 10 minutes at the boil (3 gm. Marseilles soap+1 gm. sodium carbonate per litre), then rinsed and dried.

In this manner a strong scarlet shade is obtained in contrast to untreated cotton, on which only a very weak shade is obtained by otherwise similar dyeing conditions.

*Example 29*

A cotton hank, pretreated according to the instructions in Example 28, is dyed in the following manner: 1 part by weight of the condensation product derived from m-benzoylchloride-sulphonic-acid and the condensation product from 1 mol cyanuryl chloride, 1 mol aniline and 2 mols 2-amino-anthraquinone are dissolved in 200 parts by volume of water, 0,5 parts by volume of 10% acetic acid and 5 parts by weight of anhydrous sodium sulphate are added. The cotton hank is entered at 60° C., the bath temperature raised in 15 minutes to 95° C. and dyeing continued for a further 45 minutes at this temperature. Hereupon the material is hydro-extracted, worked for 10 minutes in a cold bath containing 50 ccm. caustic soda 36° Bé. and 50 gms. sodium chloride per litre, rinsed and soured with 5 ccm. hydrochloric acid per litre. It is then rinsed 5 minutes at 80° C. and soaped 10 minutes at the boil (3 gms. Marseilles soap per litre), finally rinsed and dried.

In this manner a strong yellow shade is obtained in contrast to untreated cotton, on which only a weak dyeing is obtained by otherwise similar dyeing conditions.

*Example 30*

10 parts by weight of cotton hank are soaped for 15 minutes at the boil (6 gms. Marseilles soap +5 gms. sodium carbonate per litre), rinsed and then treated for 30 minutes in the following bath: 5 parts by weight of the condensation product derived from formanilide, $\alpha:\alpha'$-dichlordimethylether and thio-urea according to the method given in Example 15 are dissolved in 100 parts by volume of water, and then 5 parts by weight of sodium acetate crystals are further added and dissolved. After treatment, the material is hydro-extracted, dried for 1 hour at 60° C., then heated for 15 minutes at 110° C., and rinsed.

The cotton hank so treated is dyed for 1 hour at 50–60° C. in a dyebath composed of 0.6 parts by weight of Indigosol Green IB (Schultz Farbstofftabellen, 7th edition, volume 2, page 133), 200 parts by volume of water, 0.18 part by weight of hydrosulphite, 0.1 part by weight of sodium carbonate, and 10 parts by weight of crystallized sodium sulphate. Hereupon, the cotton hank is hydro-extracted, then treated for 15 minutes at room temperature in a bath containing 1 gm. sodium nitrite and 20 ccm. sulphuric acid 66° Bé. per litre, and rinsed. The dyeing is then neutralised in a solution of 2 gms. sodium carbonate per litre at 35° C., soaped at the boil for 15 minutes (5 gms. Marseilles soap per litre), rinsed and dried.

In this manner, a strong green dyeing is obtained. The same dyeing process carried out on untreated cotton produces a much weaker dyeing.

*Example 31*

A cotton hank, pretreated according to the method given in Example 30, is dyed for 1 hour at 27–30° C. in a dyebath composed of 0,6 part by weight Indigosol Blue IBC paste (Schultz Farbstofftabellen, 7th edition, Supplementary volume 1, page 108), 200 parts by volume of water and 10 parts by weight of crystallized sodium sulphate. Hereupon the cotton is hydro-extracted, then treated 15 minutes at room temperature in a bath containing 1 gm. sodium nitrite and 20 ccm. sulphuric acid 66° Bé. per litre, and finally rinsed. The dyeing is then neutralised in a solution of 2 gms. sodium carbonate per litre at 35° C., soaped at the boil for 15 minutes (5 gms. Marseilles soap per litre), rinsed, and dried.

In this manner a beautiful blue shade is obtained. The dyeing made in the same manner on untreated cotton is very much weaker.

*Example 32*

10 parts by weight of cotton hank are steeped for 30 minutes at 30° C. in 100 parts by volume of a 10% solution of caustic soda, then rinsed until it gives an alkali-free reaction, whereupon the material is worked for 30 minutes at 30° C. in a bath consisting of 100 parts by volume of water, 5 parts by weight of the condensation product derived from acetanilide, $\alpha:\alpha'$-dichlordimethylether and thio-urea according to the method given in Example 16 and 5 parts by weight of sodium acetate crystals. Hereupon it is hydro-extracted, dried for 1 hour at 60° C., then heated for 15 minutes at 110° C., and finally rinsed.

The cotton hank thus pretreated is dyed with Indigosol O4B (Schultz Farbstofftabellen, 7th edition, No. 1314) according to the process described in Example 31.

In this manner, a deep blue dyeing is obtained. The dyeing obtained in the same way on untreated cotton is very much weaker.

*Example 33*

10 parts by weight of cotton hank are worked for 30 minutes at 35° C. in a bath composed of 50 parts by volume of water, 1 part by weight of the condensation product derived from acetanilide, $\alpha:\alpha'$-dichlordimethylether and thio-urea according to the instructions given in Example 16, and 2 parts by weight of sodium acetate. Hereupon the cotton is hydro-extracted, dried for 1 hour at 60° C., heated for 15 minutes at 110° C., and rinsed.

The cotton hank thus treated is dyed in a bath composed of 0.3 part by weight of Cloth Fast Red R (Schultz Farbstofftabellen, 7th edition, volume 2, page 222), 200 parts by volume of water, 1 part by volume of 10% acetic acid, and 2 parts by weight of anhydrous sodium sulphate. The cotton is entered at 60° C., the temperature of the dyebath is raised in 15 minutes to 90° C. and dyeing is continued a further 30 minutes at this temperature. Thereupon the dyeing is rinsed and dried.

In this way, a deep red dyeing is obtained. The dyeing obtained on untreated cotton by the same dyeing process is distinctly weaker.

*Example 34*

According to the following method, an outstanding softening and water-repellency may be obtained on textiles:

10 parts by weight of the thio-urea condensation product described in Example 23 are pasted up with 10 parts by volume of alcohol, whereupon 100 parts by volume of water at 70° C. are added to the alcohol-moist product. A clear solution is formed at once, which is then made up to 1000 parts by volume with cold water. 3 parts by weight of sodium acetate are then added to this solution, which is then used to pad cotton poplin, which has been previously dyed with 3% Direct Sky Blue GS (Schultz Farbstofftabellen, 7th edition, No. 510). After padding, the material is so squeezed that it retains 100% of its own weight of the solution, is then dried at 75° C. and is subjected to a heat-treatment at 100–140° C. for 4 minutes. The material thus obtained is outstandingly soft and water-repellent.

*Example 35*

18.5 parts by weight of 2-acetylamino-naphthalene and 34.5 parts by weight of $\alpha:\alpha'$-dichlordimethylether are heated together with stirring at 100–105° C., and the reaction mixture is maintained at this temperature until the end of the reaction, which lasts about 25 hours. Hereupon the excess ether is removed by vacuum distillation.

25 parts by weight of this reaction product are dissolved in 100 parts by volume of cold alcohol, and to this is added a solution of 9.1 parts by weight of thio-urea in 70 parts by volume of hot alcohol. The temperature of the reaction mixture is maintained at 45° C. After the reaction mixture has been allowed to stand for several hours further, and a test sample has become soluble in water, it is evaporated to dryness in vacuo.

This product may be freed from insoluble portions, which may possibly still be present, by dissolving in water, filtering and evaporating.

The new reaction product obtained in this way is a brownish powder, which is easily soluble in water. The aqueous solution of the new product, to which sodium acetate has been added, deposits insoluble basic decomposition products on heating.

The new condensation product may be used in the same manner as the corresponding condensation products derived from formanilide or acetanilide for the pretreatment of cellulose materials.

*Example 36*

10 parts by weight of methylene-di-stearic-acid-amide, (which, for example, may be obtained by heating stearic-acid-amide with concentrated sulphuric acid and formaldehyde in glacial acetic acid solution, or by heating methylol-stearic-acid-amide with mineral acids) and 20 parts by weight of symmetrical dichlordimethylether, or the corresponding quantity of symmetrical dibromdimethylether, are heated together with stirring for 5 hours at 90–100° C. The evolution of hydrochloric acid gas, which is at first vigorous, is then complete, and a test sample, after heating for a short time with pyridine, becomes soluble in water. After removal of the excess ether by vacuum distillation at water-bath temperature, the condensation product is obtained in the form of a wax-like mass, easily soluble in organic solvents, which possesses very reactive halogen atoms, and which may be used in the most varying reactions.

15 parts by weight of the condensation product described above are mixed with 12 parts by volume of acetone and slowly added, with stirring, at 10° C. to a suspension of 3.5 parts by weight of finely powdered thio-urea in 30 parts by volume of acetone. After stirring at 10–20° C. for 2 hours, the mixture is filtered and the acetone is removed by vacuum distillation, when the reaction product is obtained in the form of a white powder, which, when dissolved in a small quantity of alcohol and diluted with water, gives a clear, foaming solution. On boiling, the aqueous solution becomes turbid after a short time, and the foaming properties gradually disappear.

The new product corresponding probably to the formula indicated in Example 5, is particularly suitable for the preparation of water-repellent effects on textiles which are fast to washing. These may be produced according to the method given in Example 5. In a similar manner, N-acetyl-N'-stearoyl-methylenediamine may be used in place of the methylene-stearic-acid-amide. Furthermore, the product derived from methylene-distearic-acid-amide and $\alpha:\alpha'$-dichlordimethylether may be converted into a quaternary pyridinium compound by short heating with pyridine.

*Example 37*

25 parts by weight of methylene-dibenzamide are introduced with stirring into 50 parts by weight of $\alpha:\alpha'$-dichlordimethylether and then heated to 105–115° C. After about 15 minutes, the evolution of hydrochloric acid gas commences, which, after a further 16 hours, is practically no longer noticeable. The excess of dichlordimethylether is removed by vacuum distillation at 80–90° C. 42 parts by weight of a viscous, brownish-red oil remain behind, a test sample of which is soluble in water after heating with some pyridine.

25 parts by weight of the condensation product described are dissolved in about 30 parts by volume of absolute alcohol and dropped at 40–50° C. into a suspension of 12 parts by weight of thio-urea in 50 parts by volume of absolute alcohol. The thio-urea goes slowly into solution, and, after about 20 hours a test sample gives an almost clear solution in water. The alcohol is removed by distillation in vacuo at 40–50° C., leaving a residue of 40 parts by weight of a friable, yellow mass. The new condensation product corresponding probably to the formula indicated in Example 9, is soluble in cold water to an opalescent solution. On boiling, the solution becomes first of all clear, then gradually deposits insoluble products.

*Example 38*

7.4 parts by weight of the condensation product derived from $\alpha:\alpha'$-dichlordimethylether and the amide obtained from hardened fish-oil fatty acids, as described in Example 12, are dissolved in 20 parts by volume of acetone. A solution of 3 parts by weight of 2-mercapto-thiazoline in 20 parts by volume of acetone are run in while cooling with ice, and the mixture is allowed to stand about 3 hours at room temperature. After about 1½ hours' heating at 40–45° C., the precipitated condensation product, the quantity of which may be still further increased by cooling, is filtered off at the vacuum pump and is triturated with a little diethylether. The new condensation product is a white amorphous powder, which gives an opalescent solution when water is added to its solution in alcohol.

The new condensation product corresponding probably to the formula

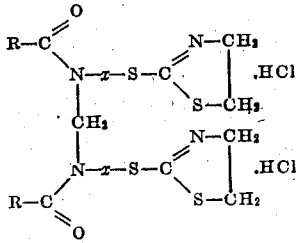

wherein R stands for the alkyl radical contained in the hardened fish-oil fatty acids and $x$ stands for a bridge derived from $\alpha:\alpha'$-dichlordimethylether, may be used for the production of fast-to-washing water-repellent effects on cotton fabrics by the working method given in Example 5. For this purpose, it is preferable to use a solution which contains 20 parts by weight of the new condensation product, as well as the calculated quantity of sodium acetate, in every 1000 parts by volume.

In a similar manner, 4-methyl-2-mercapto-thiazole may be used in place of the mercaptothiazoline.

Example 39

The amide derived from hardened fish-oil fatty acids is condensed with $\alpha:\alpha'$-dichlordimethylether according to the instructions given in Example 12, and the product obtained is freed from volatile portions by distillation under reduced pressure at about 80–85° C. 14.7 parts by weight of the condensation product thus obtained are dissolved in 15 parts by volume of acetone and the solution, after being poured off from any small undissolved portions, is run into a suspension of 5 parts by weight of finely powdered dicyandiamide in 50 parts by volume of acetone while stirring rapidly. Stirring is continued for about 2 hours while the temperature is maintained by keeping in a bath at 40–45° C. and the deposited reaction product is then filtered off at the vacuum pump. The condensation product, after being freed from adhering solvent, is a solid mass, which is taken up by warm water to give a solution which foams on shaking. It is exceptionally suitable for the softening of viscose rayon.

Example 40

The process described in Example 39 is carried out in exactly the same manner, replacing, however, 5 parts by weight of dicyandiamide by 3.4 parts by weight of cyanamide. The condensation product thus obtained possesses similar properties to the product obtained in Example 39.

What we claim is:

1. Process for the manufacture of condensation products, which comprises condensing an amide, in which at least one nitrogen atom bound to a carbonyl group is connected with at least one hydrogen atom, with an $\alpha:\alpha'$-dihalogenalkyl ether, and treating the reaction product thus obtained with a solubilizing agent containing at least one nitrogen atom directly linked to at least one carbon atom and selected from the group consisting of thio-ureas capable of reacting in the iso form, secondary and tertiary amines, cyclic compounds containing at least one basic nitrogen atom and at least one mercapto group, cyanamide and dicyandiamide.

2. Process for the manufacture of condensation products, which comprises condensing an amide, in which at least one nitrogen atom bound to a carbonyl group is connected with at least one hydrogen atom, with an $\alpha:\alpha'$-dihalogenalkylether, and condensing the reaction product thus obtained with thio-urea.

3. Process for the manufacture of condensation products, which comprises condensing an amide, in which at least one nitrogen atom bound to a carbonyl group is connected with a hydrogen atom and with a hydrocarbon radical, with an $\alpha:\alpha'$-dihalogenalkylether, and condensing the reaction product thus obtained with thio-urea.

4. Process for the manufacture of condensation products, which comprises condensing an amide, in which at least one nitrogen atom bound to a carbonyl group is connected with a hydrogen atom and with an aryl radical, with an $\alpha:\alpha'$-dihalogenalkylether, and condensing the reaction product thus obtained with thio-urea.

5. Process for the manufacture of condensation products, which comprises condensing acetanilide with $\alpha:\alpha'$-dichlordimethyl ether and thereupon with thio-urea.

6. Process for the manufacture of condensation products which comprises condensing a N:N'-diacylated methylenediamine, in which at least one nitrogen atom bound to a carbonyl group is connected with at least one hydrogen atom, with an $\alpha:\alpha'$-dihalogenalkylether, and treating the reaction product thus obtained with a solubilizing agent containing at least one nitrogen atom directly linked to at least one carbon atom and selected from the group consisting of thio-ureas capable of reacting in the iso form, secondary and tertiary amines, cyclic compounds containing at least one basic nitrogen atom and at least one mercapto group, cyanamide and dicyandiamide.

7. Process for the manufacture of condensation products which comprises condensing a N:N'-diacylated methylenediamine, in which at least one nitrogen atom bound to a carbonyl group is connected with at least one hydrogen atom, and in which at least one acyl radical is the acyl radical of a fatty acid containing at least 12 carbon atoms, with an $\alpha:\alpha'$-di-halogenalkylether, and treating the reaction product thus obtained with a solubilizing agent containing at least one nitrogen atom directly linked to at least one carbon atom and selected from the group consisting of thio-ureas capable of reacting in the iso form, secondary and tertiary amines, cyclic compounds containing at least one basic nitrogen atom and at least one mercapto group, cyanamide and dicyandiamide.

8. Process for the manufacture of condensation products, which comprises condensing a N:N'-diacylated methylenediamine, in which at least one nitrogen atom bound to a carbonyl group is connected with at least one hydrogen atom, and in which at least one acyl radical is the acyl radical of a fatty acid containing at least 12 carbon atoms, with $\alpha:\alpha'$-dichlorodimethylether, and condensing the reaction product thus obtained with thio-urea.

9. Process for the manufacture of condensation products, which comprises condensing N:N'-distearoyl-methylenediamine with $\alpha:\alpha'$-dichlorodimethylether and condensing the reaction product thus obtained with thio-urea.

10. Process for the manufacture of condensation products, which comprises condensing a primary amide, in which at least one nitrogen atom is bound to a carbonyl group, with at least 1.5 mol of an α:α'-dihalogenalkylether calculated on each primary amide group, and treating the reaction product thus obtained with a solubilizing agent containing at least one nitrogen atom directly linked to at least one carbon atom and selected from the group consisting of thio-ureas capable of reacting in the iso form, secondary and tertiary amines, cyclic compounds containing at least one basic nitrogen atom and at least one mercapto group, cyanamide and dicyandiamide.

11. Process for the manufacture of condensation products, which comprises condensing a primary amide of a fatty acid containing at least 12 carbon atoms, with at least 1.5 mol of an α:α'-dihalogen alkylether calculated on each primary amide group, and treating the reaction product thus obtained with a solubilizing agent containing at least one nitrogen atom directly linked to at least one carbon atom and selected from the group consisting of thio-ureas capable of reacting in the iso form, secondary and tertiary amines, cyclic compounds containing at least one basic nitrogen atom and at least one mercapto group, cyanamide and dicyandiamide.

12. Process for the manufacture of condensation products which comprises condensing a primary amide of a fatty acid containing at least 12 carbon atoms, with at least 1.5 mol of α:α'-dichlorodimethylether, and condensing the reaction product thus obtained with thio-urea.

13. Process for the manufacture of condensation products, which comprises condensing 1 mol of stearic acid amide with at least 1.5 mol of α:α'-dichlorodimethylether, and condensing the reaction product thus obtained with at least 1 mol of thio-urea.

14. A compound of the formula

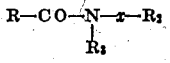

wherein R₃ represents a member of the group consisting of a hydrocarbon radical and the

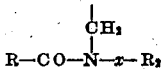

radical, R—CO— represents the acyl radical of a carboxylic acid, $x$ represents a methylene group-containing bridge derived from an α:α'-dihalogenalkylether, and R₂ represents the radical of a solubilizing agent containing at least one nitrogen atom directly linked to at least one carbon atom and selected from the group consisting of thioureas capable of reacting in the iso form, secondary and tertiary amines, cyclic compounds containing at least one basic nitrogen atom and at least one mercapto group, cyanamide and dicyandiamide.

15. A compound of the formula

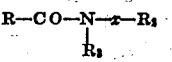

wherein R₃ represents an aromatic hydrocarbon radical, R—CO— represents the acyl radical of a carboxylic acid, $x$ represents a methylene group-containing bridge derived from an α:α'-dihalogenalkylether, and R₂ represents the radical of a solubilizing agent containing at least one nitrogen atom directly linked to at least one carbon atom and selected from the group consisting of thioureas capable of reacting in the iso form, secondary and tertiary amines, cyclic compounds containing at least one basic nitrogen atom and at least one mercapto group, cyanamide and dicyandiamide.

16. A compound of the formula

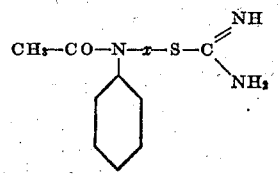

wherein $x$ represents a methylene group-containing bridge derived from α:α'-dichlordimethyl ether.

17. A compound of the formula

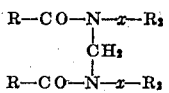

wherein R—CO— represents the acyl radical of a carboxylic acid, $x$ represents a methylene group-containing bridge derived from an α:α'-dihalogenalkylether, and R₂ represents the radical of a solubilizing agent containing at least one nitrogen atom directly linked to at least one carbon atom and selected from the group consisting of thioureas capable of reacting in the iso form, secondary and tertiary amines, cyclic compounds containing at least one basic nitrogen atom and at least one mercapto group, cyanamid and dicyandiamide.

18. A compound of the formula

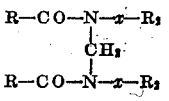

wherein R—CO— represents the acyl radical of a carboxylic acid, at least one R—CO— radical being the acyl radical of a fatty acid containing at least 12 carbon atoms, $x$ represents a methylene group-containing bridge derived from an α:α'-dihalogenalkylether, and R₂ represents the radical of a solubilizing agent containing at least one nitrogen atom directly linked to at least one carbon atom and selected from the group consisting of thioureas capable of reacting in the iso form, secondary and tertiary amines, cyclic compounds containing at least one basic nitrogen atom and at least one mercapto group, cyanamid and dicyandiamide.

19. A compound of the formula

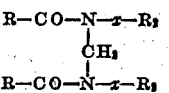

wherein R—CO— represents the acyl radical of a carboxylic acid, at least one R—CO— radical being the acyl radical of a fatty acid containing at least 12 carbon atoms, $x$ represents a methylene group-containing bridge derived from an α:α'-dichlorodimethylether, and R₂ represents the radical of a solubilizing agent containing at least one nitrogen atom directly linked to at least one carbon atom and selected from the group consisting of thioureas capable of reacting in the iso form, secondary and tertiary amines, cyclic compounds containing at least one basic nitrogen atom and at least one mercapto group, cyanamid and dicyandiamide.

20. A compound of the formula

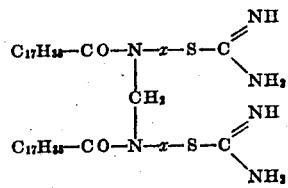

wherein $x$ represents a methylene group-containing bridge derived from $\alpha:\alpha'$-dichlordimethylether.

21. A compound of the formula

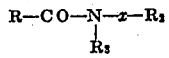

wherein $R_3$ represents a hydrocarbon radical, R—CO— represents the acyl radical of a carboxylic acid, $x$ represents a methylene group-containing bridge derived from an $\alpha:\alpha'$-dihalogenalkylether, and $R_2$ represents the radical of a solubilizing agent containing at least one nitrogen atom directly linked to at least one carbon atom and selected from the group consisting of thioureas capable of reacting in the iso form, secondary and tertiary amines, cyclic compounds containing at least one basic nitrogen atom and at least one mercapto group, cyanamide and dicyandiamide.

22. A compound of the formula

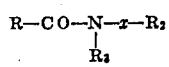

wherein $R_3$ represents a hydrocarbon radical, R—CO— represents the acyl radical of a fatty acid containing at least 12 carbon atoms, $x$ represents a methylene group-containing bridge derived from an $\alpha:\alpha'$-dihalogenalkylether; and $R_2$ represents the radical of a solubilizing agent containing at least one nitrogen atom directly linked to at least one carbon atom and selected from the group consisting of thioureas capable of reacting in the iso form, secondary and tertiary amines, cyclic compounds containing at least one basic nitrogen atom and at least one mercapto group, cyanamide and dicyandiamide.

23. A compound of the formula

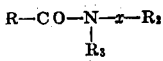

wherein $R_3$ represents a hydrocarbon radical, R—CO— represents the acyl radical of a fatty acid containing at least 12 carbon atoms, $x$ represents a methylene group-containing bridge derived from an $\alpha:\alpha'$-dichlordimethylether, and $R_2$ represents the radical of a solubilizing agent containing at least one nitrogen atom directly linked to at least one carbon atom and selected from the group consisting of thioureas capable of reacting in the iso form, secondary and tertiary amines, cyclic compounds containing at least one basic nitrogen atom and at least one mercapto group, cyanamid and dicyandiamide.

24. A compound of the formula

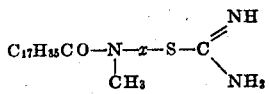

wherein $x$ represents a methylene group-containing bridge derived from $\alpha:\alpha'$-dichlordimethylether.

CHARLES GRAENACHER.
RICHARD SALLMANN.
OTTO ALBRECHT.